United States Patent [19]
Enderle et al.

[11] Patent Number: 5,645,127
[45] Date of Patent: Jul. 8, 1997

[54] COOLANT SUPPLY ARRANGEMENT FOR JET ENGINE TURBINE WALLS

[75] Inventors: Heinrich Enderle, Groebenzell; Achim Ottenstein, Eichenau, both of Germany

[73] Assignee: MTU Motoren-Und Turbinen-Union Muenchen GmbH, Munich, Germany

[21] Appl. No.: 240,585

[22] Filed: May 9, 1994

[30] Foreign Application Priority Data

May 7, 1993 [DE] Germany .................. 43 15 256.2

[51] Int. Cl.⁶ .................................... F28D 7/06
[52] U.S. Cl. .................. 165/176; 165/175; 165/169; 165/168; 60/267
[58] Field of Search .................. 165/176, 175, 165/168, 169; 60/267, 266

[56] References Cited

U.S. PATENT DOCUMENTS

| | | | |
|---|---|---|---|
| 2,867,416 | 1/1959 | Lieberherr | 165/169 |
| 2,880,577 | 4/1959 | Halford et al. | 165/169 |
| 2,975,590 | 3/1961 | Vonder Esch | 165/169 |
| 3,043,103 | 7/1962 | Dent et al. | 60/267 |
| 3,131,535 | 5/1964 | Hensley | 165/169 |
| 3,190,070 | 6/1965 | Neu, Jr. | 60/267 |
| 3,234,755 | 2/1966 | Richelli | 165/175 |
| 3,595,025 | 7/1971 | Stockel et al. | 60/267 |
| 4,078,604 | 3/1978 | Christl et al. | 60/267 X |
| 4,114,597 | 9/1978 | Erb | 165/170 X |
| 4,265,225 | 5/1981 | Berger et al. | 165/175 X |
| 4,292,958 | 10/1981 | Lee | 165/175 X |
| 4,309,987 | 1/1982 | Higgins, Jr. | 165/175 X |
| 4,485,643 | 12/1984 | Kato et al. | 165/175 X |
| 4,498,529 | 2/1985 | de Palézieux et al. | 165/176 |
| 4,809,774 | 3/1989 | Hagemeister | 165/176 X |
| 4,898,153 | 2/1990 | Sherwood | 165/176 X |
| 4,913,226 | 4/1990 | Hagemeister et al. | 165/176 X |
| 5,080,284 | 1/1992 | Cires | 60/266 X |
| 5,211,222 | 5/1993 | Shinmura | 165/176 |

FOREIGN PATENT DOCUMENTS

| | | | |
|---|---|---|---|
| 1117520 | 2/1982 | Canada | 165/176 |
| 0000488 | 1/1982 | Japan | 165/176 |
| 2072316 | 6/1981 | United Kingdom | 165/176 |

*Primary Examiner*—John Rivell
*Assistant Examiner*—Christopher Atkinson
*Attorney, Agent, or Firm*—Evenson, McKeown, Edwards & Lenahan, P.L.L.C.

[57] ABSTRACT

An arrangement is disclosed for distributing and supplying and removing a coolant to and from a wall of a turbine engine, in particular a turbine dynamic jet engine, which is subjected to the flow of a hot fluid and has cooling channels which can be acted upon by the coolant and which are arranged substantially parallel to one another in the wall. The arrangement includes tube guides which are spatially separated from one another and connected to the wall, a casing of each tube guide having a longitudinal slot, each tube guide being attached on an inlet or outlet side to the respective cooling channels by way of the longitudinal slot and apertures in the wall, and a soldering or welded seam connecting the tube guides to the wall along the respective longitudinal slot.

18 Claims, 2 Drawing Sheets

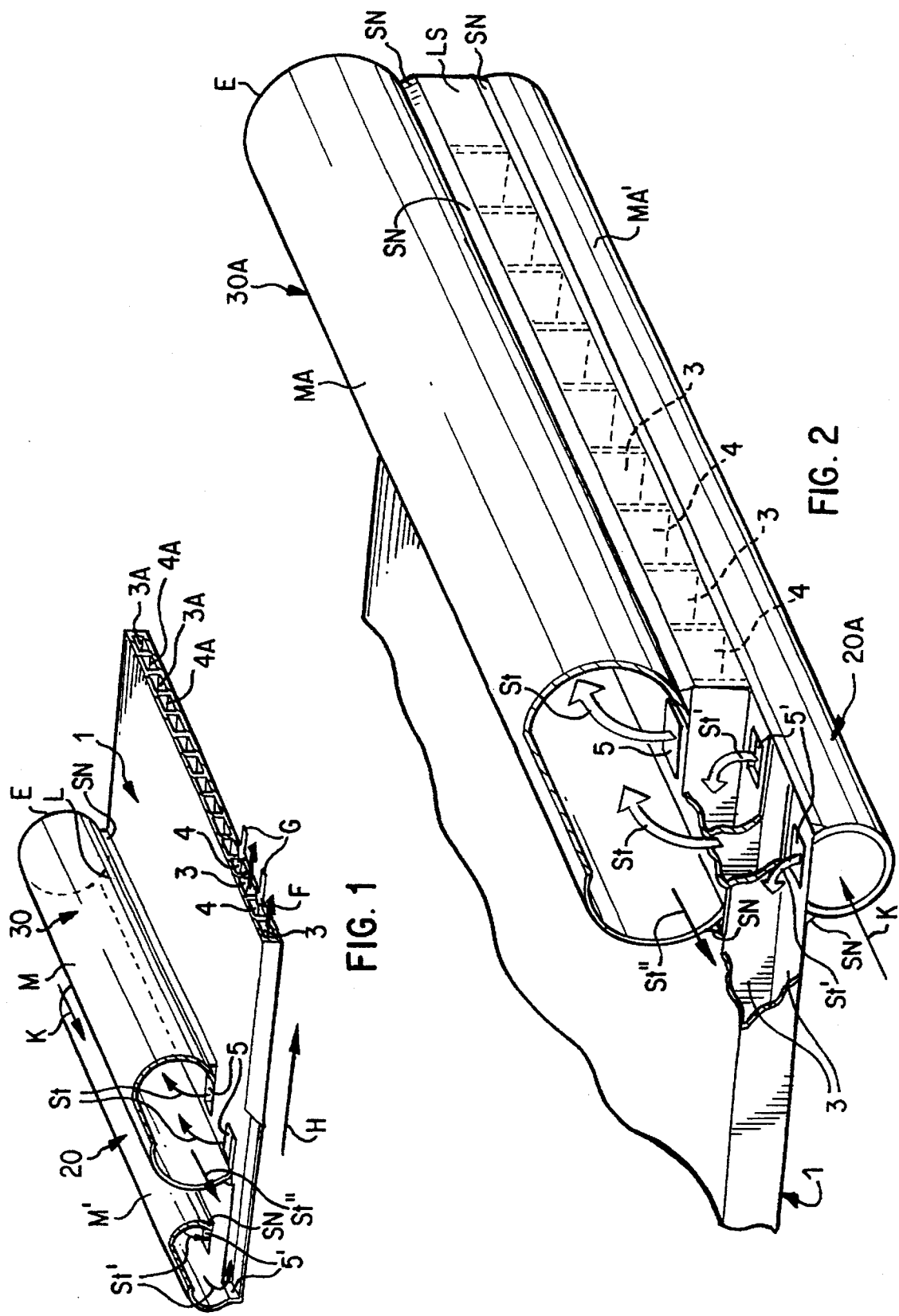

COOLANT SUPPLY ARRANGEMENT FOR JET ENGINE TURBINE WALLS

BACKGROUND AND SUMMARY OF THE INVENTION

The invention relates to an arrangement for distributing, supplying and removing a coolant to and from a wall of a turbine engine, in particular a turbo ram jet engine, which is subjected to the flow of a hot fluid and has cooling channels which can be acted upon by the coolant and which cooling channels are arranged in the wall substantially parallel to one another.

Especially in the case of turbine dynamic jet engines, which are intended to enable operation in subsonic, supersonic and hypersonic flight, extremely high wall temperatures have to be dealt with. These high wall temperatures are caused, for example, by the high temperatures of the dynamic compressed air (1500° K. and above) in the operation of dynamic jet or hypersonic flight. Extreme temperature loads and cooling requirements affect the following, inter alia: wall of variable inlet geometry; walls of flaps or slide valves which, in conjunction with central bodies, block the turbine engine when it is at a standstill on the side at which air enters, and during such blocking guide the hot dynamic compressed air into an outer annular channel of the dynamic jet engine. Furthermore, hot gas temperatures at walls, for example, of the turbine housing and an afterburner (turbine operation with/without afterburner), in particular extreme hot-gas temperatures at walls of a variable thrust nozzle which is responsible for the overall engine and thus also for hypersonic operation, have to be dealt with. Such hot-gas temperatures are notably experienced at walls of the nozzle housing and for example at adjustable or stationary wall elements which are intended to provide the necessary narrowest cross-section of the thrust nozzle in conjunction with matching nozzle convergence/divergence. In this case, the necessary coolant can be provided from the cryogenically entrained propellant (hydrogen—liquid $H_2$) which, for example with regenerative cooling, is supplied to the winding tubes of a hot-gas thrust nozzle wall and then, made into a gas, supplied to the combustion process.

Furthermore, it is known for the purpose of cooling said walls or components to use as the cooling air, air which is taken from the engine surroundings (upstream of the compressor of the basic or turbine engine), this air being guided by way of a condenser and liquified in a heat exchange with the supplied fuel (e.g., $H_2$) and either supplied in this state or in a vapor state for component cooling.

No comprehensible measures emerge from the prior art discussed as to the manner, preferably practical and simple from a structural point of view, in which the coolant concerned (e.g., $H_2$ or liquified or vapor cooling air) would be supplied in a manner fitting its purpose to individual cooling channels in wall components, or would be removed again therefrom, in such a way that a comparatively low-loss guidance of coolant which is hermetically sealed from the engine environment is achieved with highly effective cooling. In respect of different local high-temperature loads, it will furthermore be necessary to have to provide variable levels of cooling effectiveness, it being necessary at the same time to keep the structural complexity of the cooling engineering as low as possible. A design which has already been proposed, with individual distributor hoses or tubes which would each have to be attached individually to an individual cooling channel (on the supply or on the removal side) appears, in the context of what has just been said, as extremely complicated structurally and susceptible to disruption due to continuous testing/stressing of individual seals.

An object of the invention which is first outlined below is to provide an arrangement in accordance with the known type mentioned at the outset, by means of which the coolant can be supplied to or removed from all the cooling channels on the supply or removal side at the same time in a manner which is optimized with respect to requirements and with a comparatively small structural complexity.

This object is achieved according to preferred embodiments of the invention by providing an arrangement wherein tube guides which are spatially separated from one another and connected to the wall, a casing of each tube guide having a longitudinal slot, each tube guide being attached on an inlet or outlet side to the respective cooling channels by way of the longitudinal slot and apertures in the wall, and a soldering or welded seam connecting the tube guides to the wall along the respective longitudinal slot.

The tube guides can be arranged at any desired position in relation to the cooling channel structure present and the supply or removal of coolant to and from the wall or wall component concerned.

Especially by varying the supply and removal openings or apertures, the supply or removal of coolant can be controlled in a comparatively simple manner; or, the necessary coolant rates and quantities or dwell times in the channels can be influenced thereby.

The invention is furthermore particularly suitable for guiding the coolant such that it flows entirely or in certain regions in counter-current.

Within the scope of the invention, it is possible for example for only every second or third successive cooling channel to be acted upon by the coolant by way of a tube guide.

By suitable choice of the material, the tube guide size (length, cross-section) and the tube guide shape, the respective thermal expansion can be adapted to operation in optimum manner.

Because of the hermetically sealed longitudinal welding or hard soldering, individual welding and sealing connection techniques for each cooling channel are dispensed with. Moreover, a simple, low-cost manufacturing process results. This is also true in respect of the possibility of bending open the casing of a tube guide to the required slot width or, in an alternative procedure, by cutting off the casing of a tube guide which is prefabricated to be approximately cylindrical, said cutting being parallel to the casing axis along a part of the periphery.

Advantageously, only a single sealing point is required for each tube guide, in particular at the point where the coolant, e.g. $H_2$, would have to be guided away at the exit from a tube guide, that is to say at one end side, into a further pipeline which is connected for example to the burner of a turbine dynamic jet engine.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic perspective part sectional view of a cooled thrust nozzle wall constructed according to a preferred embodiment of the invention;

FIG. 2 is a schematic perspective part sectional view of a cooled nozzle wall, in this case with a double tube guide on the supply and on the removal side, separated spatially from one another, at one end region of the nozzle wall, constructed according to another preferred embodiment of the invention;

DETAILED DESCRIPTION OF THE PREFERRED EMBODIMENTS

Figure 3:
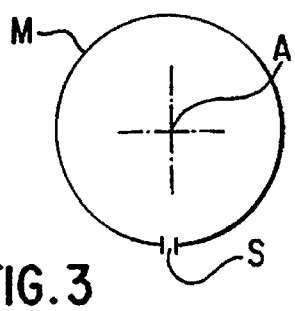
FIG. 3 is a sectional schematic view which shows a pre-fabrication phase of the cylindrical casing for a tube guide, a peripheral severing which is cut axially parallel being made, according to preferred embodiments of the invention.

FIG. 1 shows a thrust nozzle wall 1 with two tube guides 20, 30, which are arranged spatially separated from one another thereon, namely a "distributor tube" 20 and a "collection tube" 30. On one side, the inside in this case, the thrust nozzle wall 1 is exposed to the flow of a hot gas H of extremely high temperature. For the purpose of dealing with the high temperature, the thrust nozzle wall 1 is cooled and has first and second cooling channels 3 and 4 respectively which can be acted upon by means of a coolant, e.g., liquid hydrogen ($H_2$), and which are integrated in the wall 1. Coolant flows through the first and second cooling channels 3 and 4 respectively continuously in opposite directions to one another or in counter-current over a length portion, here to be understood as from the tube guide 20 towards the right-hand wall end (arrows F, G). In relation to said longitudinal portion, the first and second cooling channels 3 and 4 respectively are arranged parallel next to one another and in the longitudinal direction within the thrust nozzle wall 1. The respectively second cooling channels 4 (direction of throughflow G) end on the exit side in apertures 5 on the outside of the thrust nozzle wall 1, the apertures 5 being connected to the interior of the tube guide 30 by way of a longitudinal slot L constructed in the casing M of the tube guide 30 (in this connection, see also FIGS. 4 or 5). The outgoing flow of the coolant through the apertures 5 into the tube guide 30 is in each case designated St.

In a manner which is comparable with the tube guide 30, apertures 5' on the inlet side are covered in sealed manner on the outside of the thrust nozzle wall 1, that is to say in this case at the left-hand wall end of the casing M' of the tube guide 20 the arrows St' designate the incoming flow of the coolant through these apertures 5' into in this case only every second successive first cooling channel 3 (direction of throughflow F).

In accordance with the invention as illustrated in FIG. 1, the casing M' of the tube guide 20 can at the same time be the covering means of the ends, in this case for example the left-hand ends, on the incoming flow side of the first cooling channels 3. At the end E which is in this case on the flap valve side, the tube guide 30 should be understood as closed in the manner of a cover. Thus, the coolant, which in accordance with the arrows St flows off into the tube guide 30, can then be supplied in accordance with the direction of the arrow St" through an outgoing flow line (not illustrated) attached in hermetically sealed manner to the tube guide 30, to a further consumer which is suitable to the engine. The other tube guide 20 can be acted upon by the coolant from the one end in accordance with the arrow K by way of a supply line (not illustrated) which is also attached in hermetically sealed manner. At the end opposite the arrow K, the other tube guide 20 should be closed on the wall side in the manner of a cover. The supply and distribution of the coolant to the respectively second cooling channels 4 (direction of throughflow G) can usefully be performed through a tube guide which is located on the right-hand end side on the outside on the thrust nozzle wall 1, this tube guide in principle corresponding to the already discussed second tube guide 20 at the left-hand outer end side of the thrust nozzle wall 1.

At least in relation to the tube guides 20 and 30 (FIG. 1), it can be seen that they run transversely by means of their casings M' and M to the direction in which the cooling channels extend, and in this case are parallel opposite one another at a spacing.

If one assumes for example that the wall component 1 in accordance with FIG. 1 is a pivotal flap valve of a thrust nozzle of square or rectangular cross-section, this flap valve adopting, together with the other flap valve, the respectively narrowest cross-section, then in the context of the measures according to the invention as increased cooling performance can be provided in regions of high heat occurrence, for example, in the vicinity of the nozzle neck; thus, the heat transfer resistance which is decisive for heat removal can be reduced locally or in certain portions. FIG. 1 schematically depicts different cross-section channels 3A, 4A for the left side of the nozzle wall 1.

FIG. 2 represents an alternative to the invention to the extent that a so-called "double tube arrangement" is constructed and arranged at the, in this case for example, rear end of the thrust nozzle wall 1, in particular in an arrangement where the fluids are separated from one another with a tube guide 20A on the supply side, similar to a distributor tube, on the inside of and below the thrust nozzle wall 1, and a rude guide 30A similar to a collection tube and arranged parallel thereto, on the outside of and above the thrust nozzle wall 1. The reference numerals of FIG. 1 are used in FIG. 2 for hydrodynamic and aerodynamic criteria and incoming and outgoing flow and distribution criteria of the coolant. In this case, for example in accordance with FIG. 2, it is possible, using an integral or subsequently welded-in longitudinal portion LS of both casings MA, MA' of the tube guides 20A, 30A, to achieve at the same time a rear sealed blocking of the wall 1 and thus of the cooling channels 3 and 4 respectively.

Figure 4:
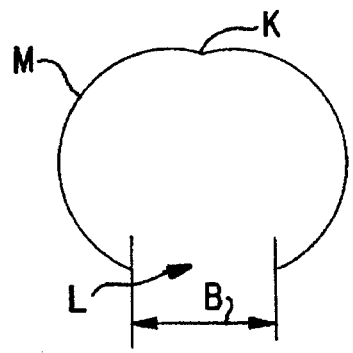
FIG. 4 shows the casing according to FIG. 3, widened to the required side width along an axially parallel bending or fold line.

In accordance with FIG. 3, each of the previously discussed tube guides can be pre-fabricated from a cylindrical casing M (or corresponding casing M', MA, MA') for example, which is severed at the point S along a surface line running parallel to the axis A. Thereafter, the casing M can be widened as shown in FIG. 4 to the required width B of the longitudinal slot L, at least along a bending line or bending edge K which runs parallel to the axis A or to the widened casing center.

Figure 5:
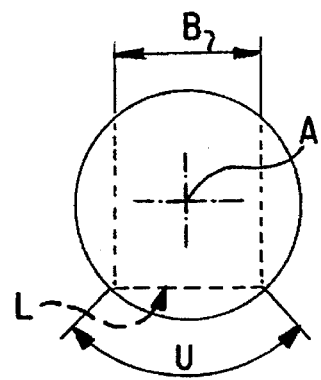
FIG. 5 shows a slot construction of the necessary length and width which is different from that of FIGS. 3 and 4, in which a peripheral section of the cylindrical casing is cut off axially parallel.

However, in accordance with the alternative method of making depicted in FIG. 5, each tube guide can also be produced from a cylindrical casing M (or corresponding casing M', MA, MA') from which part of the periphery U is cut off longitudinally to construct the longitudinal slot L of the required width B.

Using the same reference numerals followed by Suffix B, for substantially unaltered components and functions as discussed above for FIGS. 1 and 2, FIG. 6 represents an alternative in which the thrust nozzle wall 1B comprises a basic element 10B having depressions which are spaced by ribs 11B and which form the cooling channels 3B and 4B respectively by ribs 11B and depressions being welded in hermetically sealed manner to a cover element 12B, (e.g., at point P), this cover element 12B having cutouts or removed portions for the apertures 5B'. In this case, a line 13B which is connected in fixedly sealed manner to the tube guide 20B is furthermore provided for supplying the coolant (arrow K).

Figure 6:
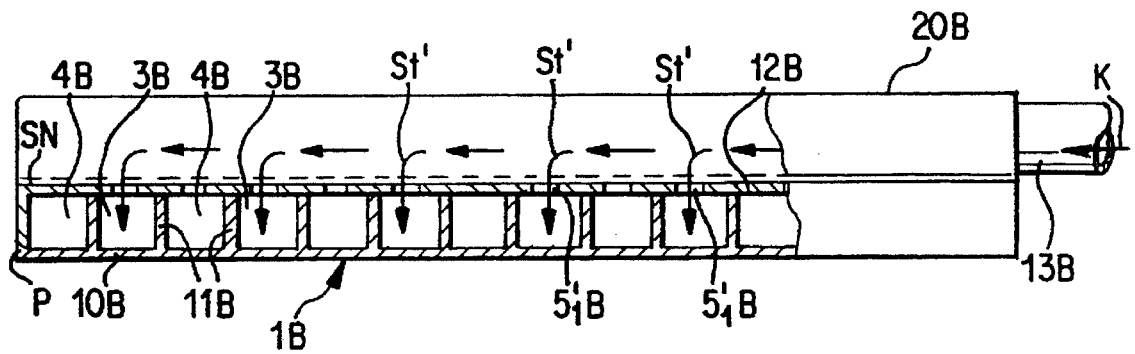
FIG. 6 is a sectional partially cut away rear end view of a cooled thrust nozzle wall in relation to a tube guide of the device and the cooling channels, with apertures in the wall, constructed according to preferred embodiments of the invention.

In each of FIGS. 1, 2 and 6, SN designates weld or solder seams along which corresponding hermetically sealing soldering or welding is carried out adjacent the longitudinal slot L concerned (in this connection, see also FIG. 4 or 5) to the thrust nozzle wall 1, 1A, 1B, for all pipe guides 20, 30, 20A, 30A, 20B.

The invention can be used with all walls or wall components of turbine or turbine dynamic jet engines which are subjected to high-temperature load, that is to say components like those specified for example in the introductory part of the description to the prior art.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A turbo jet engine coolant flow system for an engine wall member formed of first and second wall members spaced from one another with an outwardly facing surface of one wall member being impinged on by hot fluid flow during engine operations, said coolant flow system comprising:
    a plurality of first tubular coolant channels extending substantially parallel to one another between the wall members, said first tubular coolant channels extending substantially parallel to the two wall members and being bounded on respective opposite lateral sides by said two wall members,
    a plurality of second tubular coolant channels extending substantially parallel to one another between the wall members, said second tubular coolant channels extending substantially parallel to the two wall members and being bounded on respective opposite lateral sides by said two wall members,
    a plurality of first coolant flow apertures in one of said wall members which open into corresponding ones of said first tubular coolant channels for accommodating coolant flow in a direction transverse to said first tubular coolant channels,
    a plurality of second coolant flow apertures in one of said wall members which open into corresponding ones of said second tubular coolant channels for accommodating coolant flow in a direction transverse to said second tubular coolant channels,
    and a first tube guide extending in a longitudinal direction which is transverse to said first tubular coolant channels, said first tube guide having a longitudinal slot which opens to said plurality of first coolant flow apertures by way of said longitudinal slot, said first tube guide being sealingly connected to said one of said wall members by weld seams extending at respective opposite lateral sides of the longitudinal slot,whereby said first tube guide forms a coolant header for said plurality of first tubular coolant channels,
    and a second tube guide extending in a longitudinal direction which is transverse to said second tubular coolant channels, said second tube guide having a longitudinal slot which opens to said plurality of second coolant flow aperture by way of the longitudinal slot, said second tube guide being sealingly connected to said one of said wall members by weld seams extending at respective opposite lateral sides of the longitudinal slot, whereby said second tube guide forms a coolant header for said plurality of second tubular coolant channels
    wherein said first and second tube guides are spatially separated apart from one another.

2. A turbo jet engine coolant flow system according to claim 1, where one longitudinal portion of a casing which is common to both tube guides forms a closure which is soldered or welded to hermetically seal off all the coolant channel ends in the wall.

3. A turbo jet engine coolant flow system according to claim 1, wherein first and second sets of the coolant channels through which coolant flows are arranged in the wall in alternate succession opposed to one another, the first set of said channels being attached on an inlet side by way of the apertures in the wall to one tube guide, the second set of said channels being attached on an outlet side by way of the apertures in the wall to the other tube guide.

4. A turbo jet engine coolant flow system according to claim 3, wherein the apertures of the coolant channels have throughflow cross-sections of different sizes matched to the necessary degree of cooling effectiveness where there is a locally different high-temperature action on the wall.

5. A turbo jet engine coolant flow system according to claim 1, wherein the channels and tube guides are configured such that coolant flows through different numbers of coolant channels, distributed locally in groups over the wall, in the same direction or successively opposed to one another.

6. A turbo jet engine coolant flow system according to claim 1, wherein the tube guides are made from a cylindrical casing from which part of the periphery is cut off longitudinally to form the longitudinal slot of the required width.

7. A turbo jet engine coolant flow system according to claim 1, wherein the tube guides are fabricated from a cylindrical casing which is severed along an axially parallel line and is widened to the required width of the longitudinal slot.

8. A turbo jet engine coolant flow system according to claim 7, wherein the casing of the tube guides is widened to the required slot width along at least one axially parallel bending line, bending edge or bead.

9. A turbo jet engine coolant flow system according to claim 1, wherein the coolant channels have a square or rectangular throughflow cross-section and the wall is composed of square or rectangular cooling channels, the apertures being formed by locally omitted or cut-away sections of the cooling channel wall.

10. A turbo jet engine coolant flow system according to claim 1, wherein the wall comprises a basic element having depressions which are spaced by ribs and which form the cooling channels by covering the ribs and depressions by means of a cover element which has cutouts or cut-away portions for the apertures.

11. A turbo jet engine coolant flow system according to claim 1, wherein said first and second tube guides are arranged adjacent one another at one end of said wall member, said first tube guide being a header for inlet supply of coolant and said second tube guide being a header for outflow of coolant.

12. A turbo jet engine coolant flow system according to claim 11, wherein said first and second tubular coolant channels are disposed parallel to one another so as to conduct coolant flow in respectively opposite directions with respective first coolant channels extending alternatively adjacent to respective ones of said second coolant channels.

13. A turbo jet engine coolant flow system according to claim 1, wherein each tube guide is closed at one end and open at an opposite end to one of a coolant supply and a coolant exhaust line.

14. A turbo jet engine coolant flow system according to claim 13, wherein both tube guides are disposed on one of said wall members.

15. A turbo jet engine coolant flow system according to claim 13, wherein said first tube guide is disposed on said first wall member and said second tube guide is disposed on said second wall member.

16. A turbo jet engine coolant flow system according to claim 1, wherein both tube guides are disposed on one of said wall members.

17. A turbo jet engine coolant flow system according to claim 1, wherein said first tube guide is disposed on said first wall member and said second tube guide is disposed on said second wall member.

18. A turbo jet engine coolant flow system for an engine wall member formed of first and second wall members spaced from one another with an outwardly facing surface of one wall member being impinged on by hot fluid flow during engine operations, said coolant flow system comprising:

a plurality of first tubular coolant channels extending substantially parallel to one another between the wall members, said first tubular coolant channels extending substantially parallel to the two wall members and being bounded on respective opposite lateral sides by said two wall members, a plurality of second tubular coolant channels extending substantially parallel to one another between the wall members, said second tubular coolant channels extending substantially parallel to the two wall members and being bounded on respective opposite lateral sides by said two wall members, a plurality of first coolant flow apertures in one of said wall members which open into corresponding ones of said first tubular coolant channels for accommodating coolant flow in a direction transverse to said first tubular coolant channels, a plurality of second coolant flow apertures in one of said wall members which open into corresponding ones of said second tubular coolant channels for accommodating coolant flow in a direction transverse to said second tubular coolant channels, and a first tube guide extending in a longitudinal direction which is transverse to said first tubular coolant channels, said first tube guide having a longitudinal slot which opens to said plurality of first coolant flow apertures by way of said longitudinal slot, said first tube guide being sealingly connected to said one of said wall members by weld seams extending at respective opposite lateral sides of the longitudinal slot, whereby said first tube guide forms a coolant header for said plurality of first tubular coolant channels, and a second tube guide extending in a longitudinal direction which is transverse to said second tubular coolant channels, said second tube guide having a longitudinal slot which opens to said plurality of second coolant flow aperture by way of the longitudinal slot, said second tube guide being sealingly connected to said one of said wall members by weld seams extending at respective opposite lateral sides of the longitudinal slot, whereby said second tube guide forms a coolant header for said plurality of second tubular coolant channels, wherein said first and second tube guides are spatially separated apart from one another, and wherein said first and second tube guides allow for a countercurrent in said wall member by independent supply of the coolant separately to the first and second tubular coolant channels through said first and second tube guides, respectively.

* * * * *